United States Patent
Stabrowski

(10) Patent No.: US 7,334,167 B2
(45) Date of Patent: Feb. 19, 2008

(54) CIRCUIT FOR DETECTION OF INTERNAL MICROPROCESSOR WATCHDOG DEVICE EXECUTION AND METHOD FOR RESETTING MICROPROCESSOR SYSTEM

(75) Inventor: Marcin Stabrowski, Zielona Góra (PL)

(73) Assignee: Advanced Digital Broadcast S.A., Chambesy (CH)

( * ) Notice: Subject to any disclaimer, the term of this patent is extended or adjusted under 35 U.S.C. 154(b) by 450 days.

(21) Appl. No.: 10/519,049

(22) PCT Filed: Jun. 17, 2003

(86) PCT No.: PCT/PL03/00058

§ 371 (c)(1),
(2), (4) Date: Dec. 22, 2004

(87) PCT Pub. No.: WO2004/003714

PCT Pub. Date: Jan. 8, 2004

(65) Prior Publication Data

US 2005/0223301 A1    Oct. 6, 2005

(30) Foreign Application Priority Data

Jul. 1, 2002    (PL)    ..................... 354827

(51) Int. Cl.
*G06F 11/00*    (2006.01)

(52) U.S. Cl. .......................... 714/51; 714/55

(58) Field of Classification Search .................. 714/51, 714/55
See application file for complete search history.

(56) References Cited

U.S. PATENT DOCUMENTS 4,627,060 A    12/1986    Huang et al.
5,983,330 A    11/1999    Miwa et al.

FOREIGN PATENT DOCUMENTS

EP    0 945 770 A2    9/1999

*Primary Examiner*—Bryce P Bonzo
(74) *Attorney, Agent, or Firm*—Matthias Scholl P.C.; Matthias Scholl

(57) ABSTRACT

In a circuit for detection of internal microprocessor watchdog device execution comprising a microprocessor (6) with the internal watchdog device and with an input/output line (11) transmitting information about microprocessor reset, and a device for resetting the microprocessor system, to the input/output line (11) transmitting information about microprocessor (6) reset, a clock input CK is connected, which triggers the flip-flop (12), whose data input D and an inverted reset input /R are connected to the output of the device (19) for resetting the microprocessor system, and the inverted flip-flop (12) output /Q is connected to the input of the device (19ˆ) for resetting the microprocessor system.

7 Claims, 3 Drawing Sheets

CIRCUIT FOR DETECTION OF INTERNAL MICROPROCESSOR WATCHDOG DEVICE EXECUTION AND METHOD FOR RESETTING MICROPROCESSOR SYSTEM

CROSS-REFERENCE TO RELATED APPLICATIONS

This is a National Stage Application of International Patent Application No. PCT/PL03/00058, with an international filing date of Jun. 17, 2003, which is based on Polish Patent Application No. P-354827, filed Jul. 1, 2002.

TECHNICAL FIELD

The invention relates to a circuit for detection of internal microprocessor watchdog device execution and a method for resetting a microprocessor system.

BACKGROUND OF THE INVENTION

1. Field of the Invention

The present invention relates to a circuit for detection of internal microprocessor watchdog device execution and a method for resetting a microprocessor system.

2. Brief Description of the Background of the Invention Including Prior Art

A watchdog device is employed in microprocessor systems to constantly monitor if the microprocessor properly executes its programs. A properly functioning microprocessor periodically performs certain activities, for instance storing a value in a register, sending an impulse to one of its outputs, or reading data. The watchdog device monitors these activities and if they do not occur in a specific period of time, it restarts the microprocessor to restore the proper execution of microprocessor program.

In the existing systems, the watchdog device is built into the internal structure of the microprocessor, or constitutes a separate external circuit. Taking into account its functionality, the watchdog device, on its activation, may restart the microprocessor or the whole system. In case of a restart of the microprocessor itself, the restart of the whole system must be executed by the microprocessor. Some of the microprocessors having an internal watchdog device are provided with an output pin that provides information about activation of the watchdog device. Such information may be used for a restart of the whole system.

In a typical system, the clock impulse generator sends signals to the microprocessor, to the watchdog device and to other circuits of the system. In case where the watchdog device is in a form of a clock impulse counter, it sends a microprocessor a start or a reset signal after having counted a certain amount of impulses. Under normal operating conditions, the microprocessor sends a signal to the watchdog device to avoid a reset. This signal causes the watchdog to restart impulse counting. Therefore, during normal microprocessor operation the watchdog device is periodically reset. When the microprocessor operation is disrupted, the signal resetting the watchdog device will not be sent early enough and the microprocessor will be reset.

A common problem occurs while writing data to a Flash-type memory, in which the program executed by the processor is stored, when it is necessary to control the access to this memory and set it to write or read mode. For a proper operation of the system, both the write and read operations must be performed without disruptions. If any disruption in microprocessor operation occurs and the microprocessor is reset by the watchdog device, it is necessary to reset the Flash-type memory as well. This requires a reset of the whole system.

One of the known solutions to avoid the problem of access to the Flash memory is presented in the U.S. Pat. No. 5,983,330 entitled "Microcomputer with Watchdog Timer Setting Suppressing Interrupt Request Processing Over Memory Data Write Operation to Flash Memory". That solution suggests disconnecting the watchdog device from the microprocessor while writing data to the Flash memory. However, this is not an ideal solution. It requires controlling the output signal of the watchdog device. Moreover, disconnecting the watchdog device increases the probability of system crash.

Another solution is presented in a European Patent Office patent application no. EP 0 945 770 A2 entitled "Electronic control unit and method having program rewriting function". It describes method for controlling a system while writing data to a Flash memory. The drawback of this method is that the processor should signal its abnormal operation.

SUMMARY OF THE INVENTION

1. Purposes of the Invention

It is an object of this invention to provide a circuit for detection of watchdog device execution more efficient than know circuits.

This and other objects and advantages of the present invention will become evident from the description which follows.

2. Brief Description of the Invention

In a circuit for detection of internal microprocessor watchdog device execution comprising a microprocessor with the internal watchdog device and with an input/output line transmitting information about microprocessor reset, and a device for resetting the microprocessor system, to the input/output line transmitting information about microprocessor reset, a clock input CK is connected, which triggers the flip-flop, whose data input D and an inverted reset input /R are connected to the output of the device for resetting the microprocessor system, and the inverted flip-flop output /Q is connected to the input of the device for resetting the microprocessor system.

The input/output line transmitting information about microprocessor reset can be connected to the power supply voltage through an external resistor.

The reset of the microprocessor system resulting from the reset of the microprocessor can be performed when the inverted reset input /R and the flip-flop data input D are in a high state and the clock input CK changes from a low to a high state.

The reset of the microprocessor system resulting from the reset of the microprocessor can be blocked by a low state of the flip-flop inverted reset input /R.

In a method for resetting a microprocessor system comprising a circuit for detection of internal microprocessor watchdog device execution, after disruption of microprocessor operation, an input/output line of the microprocessor is set to a high impedance state and a system reset signal, generated by a flip-flop, is sent to a device for resetting the microprocessor system, and after finishing the resetting of the microprocessor system, the input/output line is set to a low state.

The microprocessor system can be reset, when the flip-flop has an inverted reset input /R, a data input D and a clock input CK, and the inverted reset input /R and the data input D are in a high state and the clock input CK changes from a low to a high state.

The reset of the microprocessor system resulting from the reset of the microprocessor can be blocked by imposing a low state on the flip-flop inverted reset input /R.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The object of this invention is shown in implementation examples in the enclosed drawings, in which.

DESCRIPTION OF THE INVENTION AND PREFERRED EMBODIMENT

Figure 1:
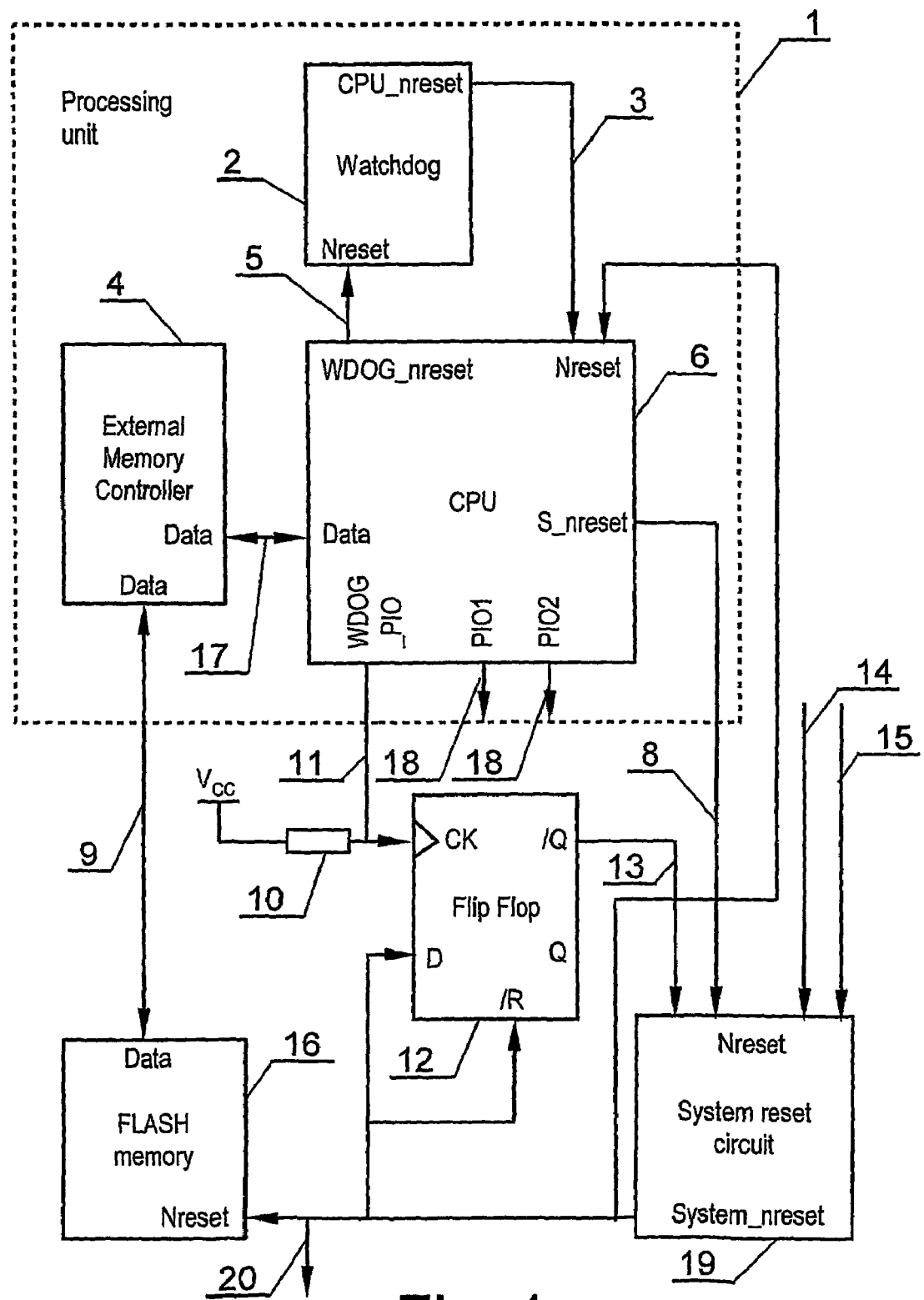
FIG. 1 illustrates a simplified schematic of a microprocessor, having an internal watchdog device.

FIG. 1 presents a system comprising a processor 1, a Flash memory block 16, a system reset circuit 19 and a flip-flop 12, responsible for detecting a reset of the central processing unit (CPU) 6 activated by the internal watchdog 2. The flip-flop 12 is triggered by a rising edge of the clock signal CK, which results in outputting at the /Q output a signal that is input to its data input D. In addition, the flip-flop output can be reset asynchronously by a reset signal /R. The processor 1 comprises a CPU 6, a watchdog device 2 and an external memory controller 4. The CPU 6, in order to write data to the Flash memory 16, sends it to the external memory controller 4 through the data bus 17. The external memory controller 4 sends the data to the Flash memory 16 through the bus 9. During the normal operation of the CPU 6, the CPU sends, in specific time periods, a reset signal 5 to the watchdog 2. If the watchdog 2 does not receive the reset signal 5 within a specific time, it sends a reset signal 3 only to the CPU 6. The reset of the CPU 6, initiated by the watchdog 2, without the reset of the whole system, including the reset of the Flash memory 16, may eventually cause a system crash. For example, the CPU 6 may then read incorrect data from the Flash memory 16. If the program executed by the CPU 6 detects by itself an abnormal system operation, it can send a reset signal 8 to the system reset circuit 19, responsible for resetting the CPU 6, the Flash memory 16 and other circuits. The system reset circuit has several inputs, activating the reset signals 20. The reset circuit is responsible for resetting specific attributes of various system components in a specific sequence. For example, the Flash memory should be reset before resetting the processor, which enables the processor to read proper data from the memory. The system reset circuit 19 can be activated also by other signals, for example by a reset signal 14 that detects power loss or by a manual reset signal 15.

The method for detecting the activation of the internal watchdog device 2 and performing the reset of the whole system (not only of the CPU 6) is based on the fact that, after the reset of the CPU 6, the processor sets a high impedance state on its outputs 11, 18. Therefore, one input/output line 11 (WDOG_PIO) has been allocated for the purpose of detecting the activation of the internal watchdog device 2. In certain CPU 6 configurations, the input/output lines 11, 18 do not have internal resistors that connect the CPU 6 pins to the power supply voltage $V_{cc}$. For such a configuration, presented in this description, an external resistor 10 has been added. It enables to obtain a high state (a logic "1") on the WDOG_PIO input/output line 11 after the CPU 6 is reset and the input/output line 11 is set to a high impedance state. The WDOG_PIO input/output line 11 of the CPU 6 is connected to the clock input CK of the flip-flop 12. The system reset signal 20 is connected to the data input D and to the inverted reset input /R of the flip-flop 12. By monitoring the input signals, the flip-flop 12 can detect when the system reset should be performed—by triggering the system reset circuit 19 by a signal from the inverted /Q output through the line 13. The truth table for the flip-flop is presented below:

| /R | CK | D | /Q |
|----|----|---|----|
| 0  | X  | X | 1  |
| 1  | ↑  | 1 | 0  |
| 1  | ↑  | 0 | 1  |

The truth table for the flip-flop 12 defines that the system reset is performed when the inverted reset input /R and the data input D are in the high state and the clock input CK changes from a low state to a high state. A low state of the inverted reset input /R imposes a high state of the inverted output /Q, despite the states of the clock input CK and the data input D, which prevents the reset of the system.

Figure 2:
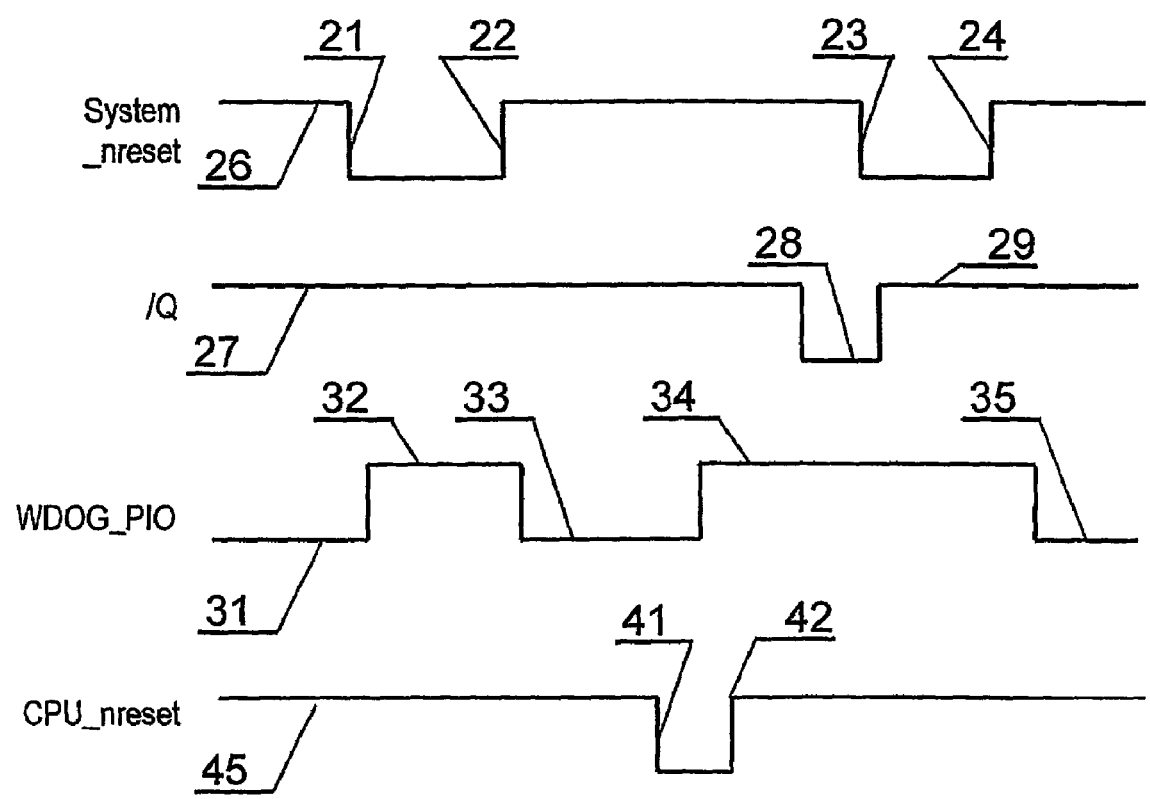
FIG. 2 illustrates a plot of signals generated by a watchdog device, a flip-flop, and a system reset circuit.

FIG. 2 presents a plot of a System_reset signal 26 (triggered by the system reset circuit 19), a plot of the /Q signal 27 (triggered by the flip-flop 12), a plot of the WDOG_PIO signal 31 (triggered by the CPU 6) and a plot of the CPU_nreset signal 45 (triggered by the internal watchdog 2). When the reset signal 21 is generated, the whole system, including the CPU 6, is reset. The reset of the CPU 6 results in setting the input/output line 18 to a high impedance state. The WDOG_PIO input/output line 11 of the CPU 6 is also set to the high impedance state, and through the resistor 10 it is set to a high state 32. After the reset procedure is finished 22, the CPU 6 executes a program that results in setting the WDOG_PIO input/output line 11 to a low state 33 (a logic "0") and performs further actions. The system starts its normal operation. If the system operation is disrupted, the watchdog 2 sends a reset signal 41 through the CPU_nreset output, which results in the reset of the CPU 6. Next, the CPU 6 sets the input/output lines 18 to a high impedance state. The WDOG_PIO input/output line 11 of the CPU 6 is also set to a high impedance state, and through the resistor 10 it is set to a high state 34. In the meantime, the reset signal becomes inactive 42. The change in state 34 of the WDOG_PIO input/output line 11 results in activation of the flip-flop 12. The output 13 of the flip-flop 12 is switched to a low state 28, thereby activating the system reset circuit 19, which results in activating at its output 20 a reset signal of a low state 23. This signal switches the output 13 of the flip-flop 12 to a high state 29, which results in deactivation system reset signal. After the system reset is finished 24, the CPU 6, executing the processor startup program, sets the WDOG_PIO input/output line 11 to a low state 35, enabling further system operation.

Figure 3:
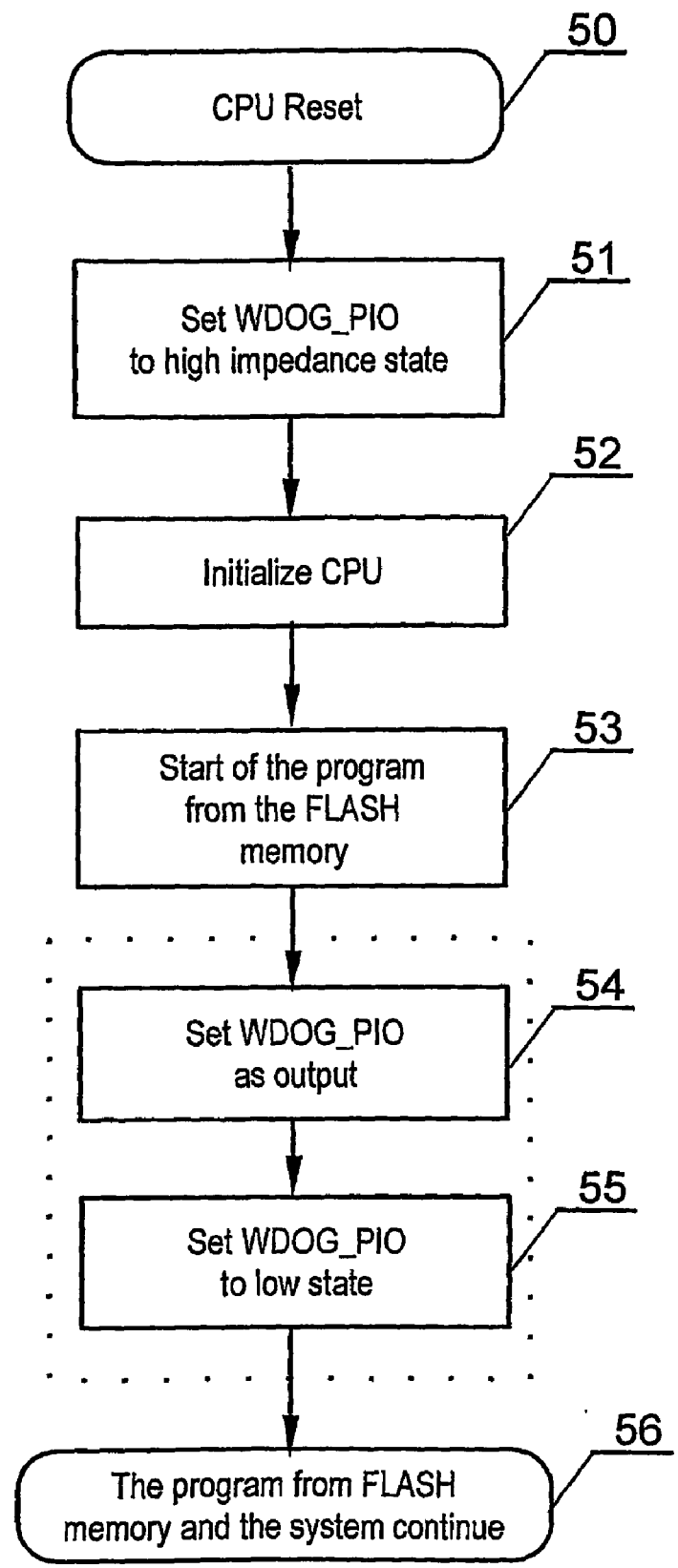
FIG. 3 illustrates a fragment of a processor startup procedure, generating a signal used in detecting the activation of the watchdog device.

A proper operation of the described system requires setting the WDOG_PIO input/output line 11 to a low state after each reset of the CPU 6, which is for simplicity referred to as a processor in the further description. FIG. 3 presents a fragment of a procedure performed during the startup of the processor, responsible for setting the WDOG_PIO input/output line 11 to a low state after the processor reset. The procedure starts from the processor reset 50. Initially, the processor sets all the input/output lines to a high impedance state in step 51. Next, it performs environment initialization procedures in step 52, where different operation parameters are set up. After the initialization is finished, the program from the Flash memory is executed in step 53. This program in its first steps allocates a specific input/output line 11, called WDOG_PIO, and sets it to an output mode in step 54. Next, it sets it to a low state in step 55. Next, in step 56, the processor continues executing further commands of the program from the Flash memory.

It will be understood that each of the elements described above, or two or more together, may also find a useful application in other types of methods for allocation of data differing from the types described above.

While the invention has been illustrated and described as embodied in the context of a method for allocation of data for images in operating memory, it is not intended to be limited to the details shown, since various modifications may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A circuit for detection of internal microprocessor watchdog device execution in a microprocessor system comprising
   a microprocessor having
      a reset input,
      an internal watchdog device generating a reset signal and connected to the reset input, and
      an input/output line WDOG_PIO transmitting information about microprocessor reset independently from the reset signal;
   a device for resetting the microprocessor system and having
      an activation input,
      a system reset output connected to the reset input of the microprocessor and configured to generate a system reset signal at the system reset output responsively to an activation input signal received at the activation input;
   a flip-flop having
      a clock input CK connected to the input/output line WDOG_PIO of the microprocessor,
      a data input D and an inverted reset input /R connected to the system reset output of the device for resetting the microprocessor system, and
      an inverted flip-flop output /Q connected to the activation input of the device (19) for resetting the microprocessor system.

2. The circuit according to claim 1 further comprising an external resistor connecting the input/output line WDOG_PIO to a power supply voltage.

3. The circuit according to claim 1, wherein reset of the microprocessor system resulting from reset of the microprocessor is performed when the inverted reset input /R and the flip-flop data input D are in a high state and the clock input CK changes from a low to a high state.

4. The circuit according to claim 1, wherein reset of the microprocessor system resulting from reset of the microprocessor is blocked by a low state of the inverted reset input /R of the flip-flop.

5. A circuit for detection of internal processor watchdog device execution in a microprocessor system comprising
   a microprocessor having an input/output;
   an internal watchdog device linked to the microprocessor via reset signal lines and activating the microprocessor;
   a flip-flop having
      a data input D,
      an inverted reset input /R connected with the data input D,
      an inverted output /Q for resetting the microprocessor, and
      a clock input CK connected to the input/output of the microprocessor via an input/output line transmitting information about microprocessor reset;
   a device for resetting the microprocessor and linked to the inverted output /Q and the inverted reset input /R of the flip-flop and the microprocessor; and
   an external resistor connecting the input/output line transmitting information about the microprocessor reset to a power supply voltage.

6. A microprocessor system comprising:
   a microprocessor having
      a reset input,
      an internal watchdog device generating a reset signal and connected to the reset input of the microprocessor, and
      an input/output line WDOG_PIO configured to transmit information about microprocessor reset independently from the reset signal;
   a system reset circuit having
      an activation input, and
      a system reset output connected to the reset input of the microprocessor and configured to generate a system reset signal at the system reset output responsively to an activation input signal received at the activation input;
   a flip-flop having
      a clock input CK connected to the input/output line WDOG_PIO of the microprocessor,
      a data input D and an inverted reset input /R connected to the system reset output of the system reset circuit, and
      an inverted output /Q connected to the activation input of the system reset circuit.

7. The microprocessor system according to claim 6, further comprising a Flash memory having a reset input connected to the system reset output of the system reset circuit.

* * * * *